May 24, 1927.

C. BORNMANN

PHOTOGRAPHIC SHUTTER

Original Filed May 16, 1924

1,630,049

INVENTOR
CARL BORNMANN
BY
Philip S. Hopkins
ATTORNEY

Patented May 24, 1927.

1,630,049

UNITED STATES PATENT OFFICE.

CARL BORNMANN, OF BINGHAMTON, NEW YORK, ASSIGNOR TO ANSCO PHOTO-PRODUCTS, INC., OF BINGHAMTON, NEW YORK.

PHOTOGRAPHIC SHUTTER.

Application filed May 16, 1924, Serial No. 713,774. Renewed March 31, 1927.

My invention relates to photographic cameras and particularly to shutters therefor. It is well known in this art that proper cooperation of the diaphragm aperture and the speed or exposure period of the shutter is necessary to correct results. With photographic shutters of the usual construction at least two operations are necessary to bring about this cooperation. One operation for adjusting the diaphragm to the proper aperture and another for setting the shutter speed to regulate the exposure period. The performance of these acts frequently results in annoying delays in preparing the camera for picture taking and it is common among amateurs to forget or neglect entirely, possibly thru ignorance, to make the proper adjustments before using the camera.

The principle above mentioned refers to the established fact that when setting the shutter for "instantaneous" or snap-shot pictures the diaphragm aperture should be adjusted to afford a comparatively larger light opening than when the shutter mechanism is set for "time" exposure, and conversely when the shutter is set for the latter, the diaphragm should be adjusted to render a relatively smaller aperture. This for the reason that greater depth and better definition can be obtained by the use of the smaller aperture. Obviously, however, when the speed or period of exposure is limited as when the shutter is set for "instantaneous" the aperture must be enlarged to admit sufficient light to produce the image on the sensitized material regardless of depth or definition.

The principal object of my invention, therefore, is to construct a shutter wherein the diaphragm is automatically and simultaneously adjusted upon the setting of the speed or exposure controlling element.

Another object is to incorporate into a shutter of the character described a novel one-piece diaphragm and speed controlling element combined.

A still further object is to provide a shutter of the character described which is simple and easy of operation and inexpensive to manufacture.

More specifically it is an object to provide a one-piece diaphragm of the pivoted or swinging leaf type provided with means for controlling the speed setting of the shutter whereby but a single operation is necessary to the proper adjustment of both these elements.

A still further object is to provide such a diaphragm with a plurality of apertures appropriate for various speed settings.

Other objects and advantages in details of construction and operation will be apparent as the description proceeds reference being had to the accompanying drawing wherein like reference numerals indicate like parts.

Figure 1:
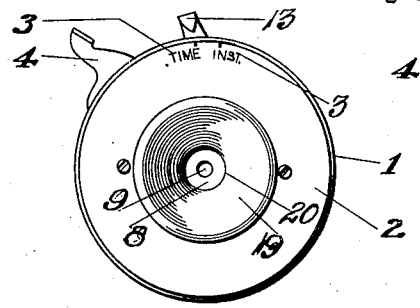
Figure 1 is a front view of my improved shutter, the same being shown adjusted for "time" exposure.

The reference numeral 1 indicates the shutter casing provided with the cover plate 2 bearing indicating marks 3, in this instance indicating "time" and "instantaneous" exposures. A shutter operating trigger or lever 4 is provided whereby the shutter blade mechanism is operated.

The supporting plate or ring 5 lies directly beneath the cover plate 2 and acts as a protecting element to the shutter mechanism in the body of the shutter. This plate 5 is provided with two openings 6 for a purpose to be described.

Pivoted upon the upstanding post 7 is my improved diaphragm and speed controlling unit 8. This diaphragm comprises a flat leaf which may be stamped or otherwise formed from sheet metal or other suitable material and is provided with a relatively small aperture 9 centrally thereof. The outer end of this diaphragm leaf is reduced as at 10, such reduced portion projecting thru the shutter case, there being a slot or recess 11 provided for this purpose. This projecting portion of the leaf is off-set as at 12 to accommodate itself to the contour of the shutter casing and the end is bent upward and back on itself as at 13 to provide at once a finger piece or manipulating handle for swinging the leaf on its pivot, and an indicating pointer cooperating with the indicating characters 3 upon the cover plate.

The opposite end 14 of the leaf is turned downward at 15, such downward portion being adapted to engage frictionally in either of the holes 6 whereby the leaf is frictionally held in either of its adjusted positions against accidental movement. It will be understood, of course, that this engagement is merely sufficient to prevent such accidental movement and does not interfere with the easy manipulation of the leaf by the finger piece 13.

Figure 6:
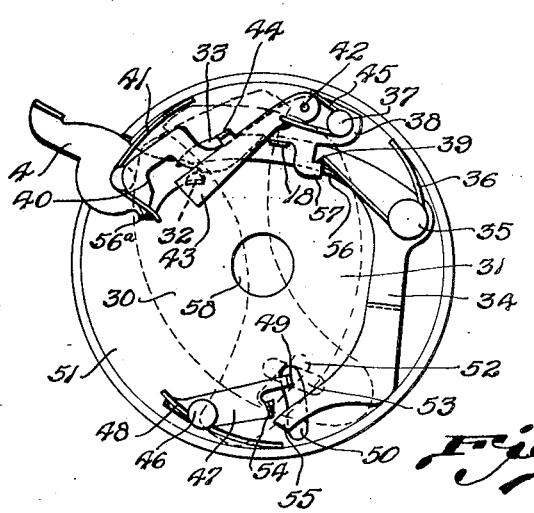
Fig. 6 is a plan view of the shutter blade controlling mechanism.

This swinging leaf or diaphragm 8 is also provided with a slot having an enlarged portion 16 and a narrow portion 17. Projecting upwardly into this slot from the shutter casing is the end 18 of a lever which is connected to the shutter blade controlling mechanism illustrated in Figure 6. This mechanism includes the shutter blades 30 and 31, shown in dotted lines, and their coacting parts. It will be understood by those skilled in the art that when the trigger 4 is depressed the inner upturned end 32 thereof engages with the end 33 of the master lever 34 pivoted at 35. A spring 36 normally forces the master lever to the position shown in Figure 6. Pivoted at 37 is a lever 38 provided near its pivot with a shoulder 39 and at its free end with shoulder 40. Spring 41 normally holds the trigger 4 in the position shown in Figure 6. Pivoted at 42 on the lever 38 is an arm 43 provided with a downwardly turned ear 44 engaging with the edges of master lever 34 and lever 38. Spring 45 normally forces the arm 43 and consequently lever 38 to the position shown.

Pivoted at 46 in the lower part of the shutter body is a lever 47 normally forced to the position shown by spring 48. The free end of this lever is provided with a lug 49 extending downwardly through a slot 50 formed in the cover plate 51 which protects the shutter blades 30 and 31. The lug 49 also engages within the intersecting slots 52 and 53 in the shutter blades. An upstanding ear 54 is also formed on the lever 47 and provided with an inclined surface ending abruptly in a perpendicular drop. The end 55 of the master lever 34 cooperates with this element in a manner about to be described.

Figure 2:
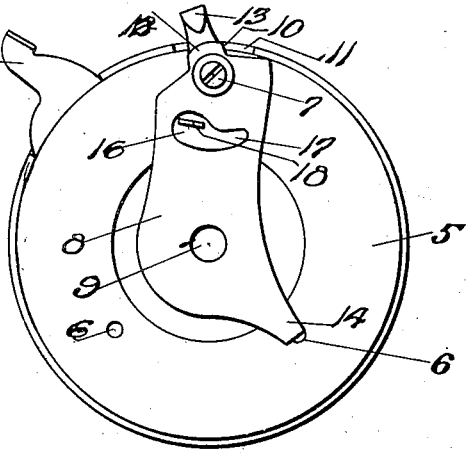
Figure 2 is an enlarged face view of the shutter, the cover plate being removed showing the diaphragm set in position for "time" exposure.

Assuming now that the diaphragm plate 8 is in the position shown in Figure 2, that is with the large end 16 of the slot adjacent the upturned lever 18 carried by lever 39, or in other words when the shutter is set for time exposures. With this setting it will be obvious that upon downward pressure of the trigger 4, the inner end 32 thereof will engage with the end 33 of the master lever rocking the same upon its pivot, and at the limit of the stroke would ride past said end 33 thus freeing the same. The upstanding lug 56 carried by said master lever will therefore ride past the arm 57 of the lever 38 against which it normally rests. As soon as this lug 56 is free of the end 57, the spring 45 promptly exerts its pressure to rock the lever 38 downwardly whereby the shoulder 39 thereof now lies in the path of the lug 56 to stop the same upon its return movement after the end 32 of the trigger has rocked far enough to disengage the end 33. It will also be understood that as the trigger 4 is depressed, the lug 56ª carried thereby will be carried around the end of lever 38 and will at the limit of its movement lie adjacent the shoulder 40 on said lever. Further as end 33 of the master lever is carried upwardly in Figure 6, by the trigger 4, the arm 43 will be carried therewith due to its engagement thru the lug 44. This will bring the end of arm 43 adjacent the lug 56ª now lying next to the shoulder 40, and said lever 43 will be held in such position by said lug, when the master lever starts its return movement, and remaining so held while the master lever is locked in its position of half return by the shoulder 39 and lug 56. It should be noted here that because of the enlargement 16 in the slot provided in the diaphragm 8, the upstanding lever 18 carried by lever 38 is permitted to make this downward movement whereby to confine the master lever before it has completed its return stroke.

Upon the initial pivoting of the master lever, the end 55 thereof rides over the inclined ear 54 and drops off on the opposite side thereof just prior to the disengagement of the opposite end 33 of the master lever with the end 32 of the trigger. Upon such disengagement, the spring 36 forces the master lever toward its normal position as far as the shoulder 39 will permit. This partial back movement causes the end 50 of the master lever to rock the lever 47 downwardly in Figure 6 but not far enough for the end 55 to disengage said lever. This movement causes the downwardly turned lug 49 to move in the slot 50 and then because of its engagement with the shutter blades 30 and 31, causes them to spread apart and uncover the lens opening 58. The parts then remain in this position with the lens opening uncovered until the trigger 4 is again depressed.

Upon this second depression the lug 56ª, which is now confined between the shoulder 40 and the free end of arm 43, exerts a pressure on said arm, which because of its connection at 42 with lever 38, rocks said lever 38 on its pivot, thus disengaging the shoulder 39 and lug 56. The master lever is now free to complete its return movement under the action of its spring 36. Upon the further downward movement of Figure 6 of the end 55, said end rides past the lug 54 on the lever 47, permitting said lever to return to its normal position and thus closing the lens opening by the shutter blades.

The importance of the enlarged end 16 of the slot in diaphragm 8 will be readily understood, for because of it, the lug or lever 18 carried by lever 38 is thus permitted a sufficient movement to allow for the locking action of the lug 56 on the master lever and the shoulder 39 on the lever 38, whereby a "time exposure" may be made. It will be obvious of course that when said lug or lever 18 is confined in the narrow end 17 of the slot, as when set for "instantaneous" exposures, such movement of lever 38 is not possible. In such event, the master lever is free to return completely to its normal position upon the disengagement of the lug 32 on the trigger 4 with the end 33 of said master lever, thus causing an opening and closing of the shutter blades over the lens opening for an instantaneous exposure. This arrangement and construction is of a conventional type old in the art and forms no part of this invention except that the slot 16—17 is in this instance provided in the diaphragm itself thereby permitting a single operating means for both the diaphragm and the speed controlling mechanism of the shutter. By way of explanation it may be said that when the diaphragm is swung to the position shown in Fig. 2, "time" exposure position, the lever 18 upon operation of the trigger 4 is permitted to move in the enlarged portion 16 of the slot where it performs the locking action of the shutter blade mechanism just described resulting in "time" exposure. When, however, the diaphragm is swung to the position shown in Fig. 3, "instantaneous" exposure, the lever 18 is confined within the narrow portion 17 of the slot where it is unable to move to perform the locking action just described, whereby the shutter blade mechanism is permitted to open and close thru a single operation of the trigger 4.

Figure 3:
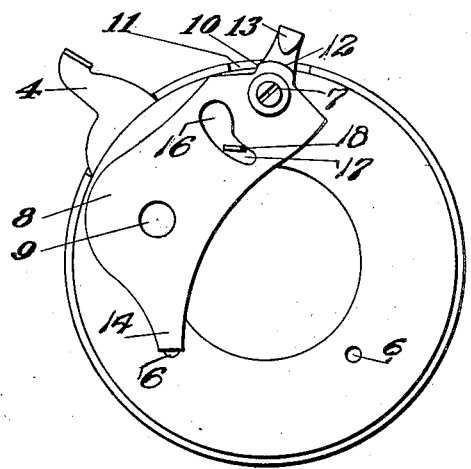
Figure 3 is a view similar to Fig. 2 showing the parts adjusted for "instantaneous" exposure.

It will be noted that when the operating lever 13 is set for "time" exposure the diaphragm is swung into the position shown in Fig. 2 which places the small aperture 9 in the center of the shutter to control the light admitted thru the lens (not shown). When, however, the operating lever is set for "instantaneous" as shown in Fig. 3 the diaphragm is swung away from the center thus permitting the lens cap 19 (see Fig. 1) with its relatively large opening 20 to define the effective aperture. The lens cap 19 may be screwed or otherwise secured to the shutter but is preferably formed as an integral part of the cover plate.

Figure 5:
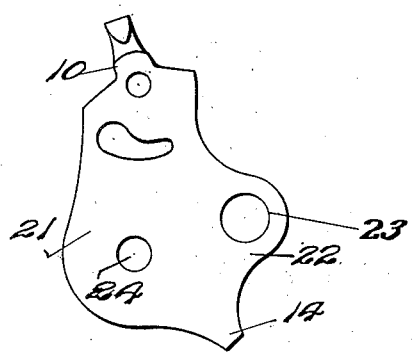
Figure 5 is a detailed view showing a modified form of the diaphragm.
Figure 4:
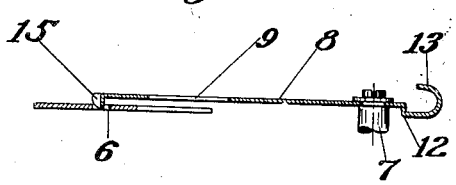
Figure 4 is a cross section of my improved diaphragm.

With the use of certain types of lenses in my improved shutter it is desirable and sometimes necessary not to depend upon the aperture 20 in the lens cap 19 for the proper "instantaneous" aperture. In such event my improved diaphragm and controlling element may be constructed as shown in Fig. 5 and comprises a leaf 21 similar in all respects to the leaf 8 except that one side thereof is enlarged as at 22 to provide room for an aperture 23 relatively larger than "time" exposure aperture 24. This construction places the apertures in the same plane which is necessary, as above explained, with certain types of lenses.

It will be understood that with this modified construction when the diaphragm is swung to the position shown in Fig. 3 the aperture 23 will occupy the center of the shutter to define the light opening thru the lens.

From the foregoing description it will be seen that I have combined into a single element all of the following devices: A diaphragm and diaphragm operating means, a speed control and speed controlling operating means. The advantages both from the operator's standpoint and from the manufacturer's point of view of this simple construction are obvious. A single adjustment of the finger piece 13 operates to set the shutter speed and simultaneously therewith adjusts the diaphragm to the proper aperture for that speed.

It will be understood also that my improved diaphragm may be provided with a greater number of apertures varying in size thus adapting the same to shutters which are provided with a plurality of speed settings such as 1/25, 1/50 and 1/100 seconds.

The operation of the shutter is obvious from the foregoing description of its parts and need not, therefore, be again described in detail. It will be apparent to those skilled in the art that many variations in details of form and construction are possible without departing from the scope of my invention. I do not limit myself, therefore, to the form shown and described other than by the appended claims.

I claim:

1. A photographic shutter including blades, actuating means therefor, and a diaphragm having a light defining aperture and an irregular opening and provided with a finger piece, said irregular opening cooperating with said actuating means for controlling the speed setting of said actuating means in accordance with said aperture.

2. A photographic shutter including blades, actuating means therefor, and a pivoted diaphragm provided with an integral finger piece, said diaphragm also provided with a light defining aperture and an irregular opening, said opening cooperating with said actuating means for controlling the speed setting of said actuating means in accordance with said aperture.

3. A photographic shutter including a diaphragm having a light defining aperture, operating means for said diaphragm, blades, and speed controlling means for said blades, said diaphragm and said operating means being in one piece, and an irregular opening provided in said diaphragm cooperating with and governing said speed controlling means in accordance with said aperture.

4. A photographic shutter including blades, actuating means therefor, a pivoted diaphragm for controlling light defining apertures, a finger piece on said diaphragm for moving the same on its pivot, means for frictionally holding said diaphragm in each of its set positions, and an irregular opening provided in said diaphragm for cooperating with and controlling the speed setting of said actuating means in accordance with the setting of said diaphragm.

5. A diaphragm for a photographic shutter comprising a pivoted leaf provided with a light defining aperture, and an irregular opening for controlling the shutter speed in accordance with said aperture, and a finger piece for said diaphragm comprising one end thereof.

6. A diaphragm for a photographic shutter comprising a pivoted leaf provided with a plurality of light defining apertures and an irregular opening for controlling the shutter speed in accordance with said apertures.

7. A diaphragm for a photographic shutter comprising a pivoted leaf reduced at one end to form an operating member, said diaphragm being provided between its ends with light defining apertures and an irregular opening for controlling the speed of the shutter in accordance with said apertures.

CARL BORNMANN.